United States Patent [19]

Koga et al.

[11] Patent Number: 4,851,906
[45] Date of Patent: Jul. 25, 1989

[54] DATA COMPRESSION USING ORTHOGONAL TRANSFORM AND VECTOR QUANTIZATION

[75] Inventors: Toshio Koga; Junichi Ohki, both of Tokyo, Japan

[73] Assignee: NEC Corporation, Japan

[21] Appl. No.: 116,061

[22] Filed: Oct. 30, 1987

[30] Foreign Application Priority Data

Nov. 4, 1986 [JP] Japan ............................. 61-263308
Nov. 5, 1986 [JP] Japan ............................. 61-264288

[51] Int. Cl.$^4$ ...................... H04N 7/133; H04N 7/137
[52] U.S. Cl. ................................ 358/133; 358/105; 358/136
[58] Field of Search ............... 358/133, 135, 136, 138, 358/105

[56] References Cited

U.S. PATENT DOCUMENTS

4,447,886  5/1984  Meeker ............................. 358/133
4,541,012  9/1985  Tescher ............................ 358/133
4,751,742  6/1988  Meeker ............................. 358/133

Primary Examiner—Howard W. Britton
Attorney, Agent, or Firm—Laff, Whitesel, Conte & Saret

[57] ABSTRACT

In an image communication system, an input image sequence is converted into a block-formatted sequence. A data compression signal indicative of the amount of moving blocks in the block-formatted sequence is generated to individually control a plurality of vector quantizers each having a particular frequency band and a memory containing output vectors. The output vectors of each of the vector quantizers is representative of inverse orthogonal transform of a code table of optimum quantized vectors in the particular frequency band, the optimum quantized vectors being orthogonal transform of interframe differential training image sequences. The output vectors is retrievable from the memory as a function of an interframe differential image sequence, or prediction error. Each vector quantizer selects one of the vectors retrieved from the memory which is nearest to the value of the interframe differential image sequence and generates an index signal representative of the selected vector, which index signal is encoded and transmitted to a destination. The outputs of the vector quantizers are processed by inverse vector quantizers to generate a predictive image sequence. The prediction error is detected as a difference between the predictive image sequence and the block-formatted sequence.

9 Claims, 6 Drawing Sheets

DATA COMPRESSION USING ORTHOGONAL TRANSFORM AND VECTOR QUANTIZATION

BACKGROUND OF THE INVENTION

The present invention relates generally to image communication systems, and more specifically to a data compression technique for image signals using orthogonal transform and vector quantization.

Vector quantization is an efficient data compression technique for full-motion image signals. According to the vector quantization coding technique, the amount of coded image information bits increases with the rate of movement of the image. Under extreme cases, the rate of the coded information bits exceeds the data rate of a transmission channel. When this occurs, the transmission is interrupted, causing discontinuities in the reproduction of the original. Vector quantizers proposed in a paper entitled "Discrete cosine transform coding system using gain/shape vector quantizers and its application to color image coding" (Saito, H., Takeo, H., Aizawa, K., Harashima, H., and Miyakawa, H., Picture Coding Symposium '86, April, Tokyo) is intended to solve this problem by reducing the image resolution as a function of the amount of rapidly moving objects since the human eyes exhibit poor perception to rapid movements. The proposed system comprises a discrete cosine transform encoder which performs discrete cosine transform on a predictive, interframe differential image sequence of the block format so that the orthogonally transformed block signals are mapped on different bands of a frequency domain. A plurality of vector quantizers are connected to the output of the encoder to effect vector quantization on the respective frequency bands. However, a substantial amount of hardware is required for implementing orthogonal transformation at the transmitter and for implementing inverse orthogonal transformation at the receiver.

SUMMARY OF THE INVENTION

It is therefore an object of the present invention to provide a communication system in which image data is compressed using orthogonal transform and vector quantization.

This object is obtained by forming code tables according to different frequency bands. Each of the code tables contains output vectors which are produced by the following steps:

(a) performing orthogonal transform on interframe differential training image sequences, so that the orthogonally transformed interframe differential training image sequences are mapped onto a frequency domain;

(b) partitioning the mapped training image sequences into different frequency bands;

(c) deriving a plurality of code tables of optimum quantized vectors respectively from the partitioned training image sequences; and (d) performing inverse orthogonal transform on the quantized vectors of each of the code tables, so that the inversely orthogonally transformed optimum quantized vectors of each of the code tables are mapped onto a spatial domain.

Each of the code tables is implemented by a memory and incorporated into a vector quantizer. The output vectors are stored and retrieved from the memory as a function of a signal representative of the interframe differential signal, or prediction error. One of the vectors which is nearest to the input value is selected and the index of the selected vector is encoded for transmission.

Specifically, the present invention provides a vector quantization encoder which comprises a scan converter for converting an input image sequence into a block-formatted sequence. A data compression signal indicative of the amount of moving blocks in the block-formatted sequence is generated to individually control a plurality of vector quantizers. Each of the vector quantizers has a particular frequency band and a memory containing output vectors, the output vectors of each of the vector quantizers being representative of inverse orthogonal transform of a code table of optimum quantized vectors in the particular frequency band, the optimum quantized vectors being orthogonal transform of an interframe differential training image sequence, the output vectors being readable from the memory as a function of an interframe differential image sequence, or prediction error. Each vector quantizer selects one of the vectors read out of the memory which is nearest to the value of the interframe differential image sequence and generates an index signal representative of the selected vector. The outputs of the vector quantizers are processed by inverse vector quantizers to generate a predictive image sequence. A subtractor is provided for detecting a difference between the block-formatted sequence and the predictive image sequence and applying the detected difference to the vector quantizers as said prediction error. An encoder is connected to the vector quantizers for encoding the index signals for transmission over a transmission channel.

According to a further aspect of the invention, there is provided a communication system which comprises the vector quantization encoder constructed in a manner as mentioned above and a vector quantization decoder which includes means for decoding the transmitted coded index signals and a plurality of inverse vector quantizers, the outputs of the inverse vector quantizers being summed and delayed for a frame interval, and summed again with a subsequent value of the sum of the outputs of the inverse vector quantizers.

Preferably, a moving vector detector is provided for detecting motion vectors from the output of the scan converter. A variable delay circuit introduces a variable delay time in accordance with the output of the moving vector detector to the predictive image sequence before it is applied to the subtractor. The timing of the encoder is also controlled in response to the detected motion vector.

BRIEF DESCRIPTION OF THE DRAWINGS

The present invention will be described in further detail with reference to the accompanying drawings, in which.

DETAILED DESCRIPTION

Figure 1:
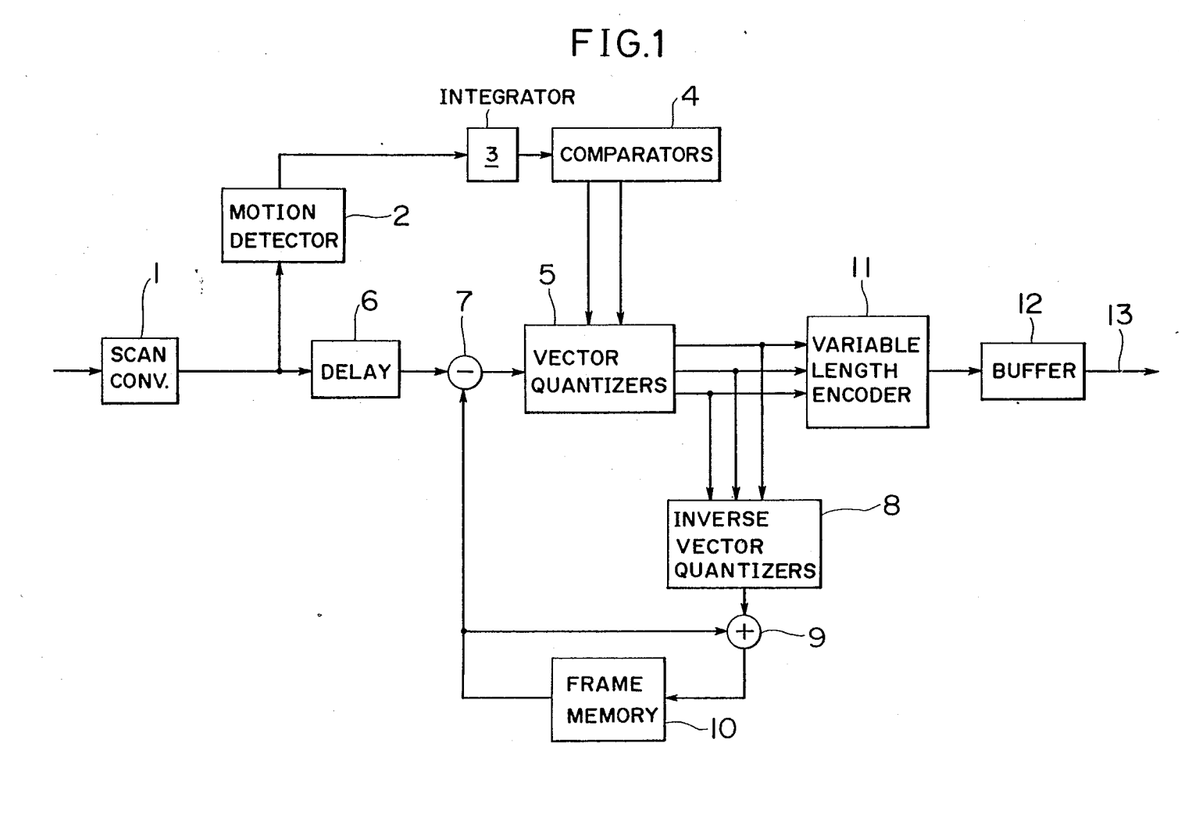
FIG. 1 is a block diagram of a vector quantization encoder according to an embodiment of the present invention.

Referring now to FIG. 1, there is shown a vector quantization encoder according to a first embodiment of the invention. The encoder comprises a scan converter 1 which converts the scan format of a full-motion input image sequence so that the output of the scan converter is representative of a series of blocks each comprising a matrix array of picture elements, or pixels. The output of scan converter 1 is applied to a motion detector 2. Motion detector 2 detects the absolute value of the interframe difference between the pixels of a given frame and the pixel of the next frame of that frame and totals the interframe differences derived from a given block and compares the total value with an appropriate threshold value. When the total value exceeds the threshold value, motion detector 2 generates an output indicating that the given block is in motion. The motion-indicating signal is applied to an integrator 3 where the rate of occurrence of blockwise motions is determined. The integrator output is supplied to a comparator unit 4 where it is compared with a plurality of reference values representative of different frequencies. Comparator unit 5 generates outputs indicating the frequencies of blockwise motions of the original picture, the comparator outputs being fed to vector quantizer unit 5 as band-elimination signals. The output of scan converter 1 is also applied to a delay circuit 6 which introduces a delay time corresponding to the time interval taken to perform motion detection and band-elimination determination. The output of delay circuit 6 is applied to a subtractor 7 to which the output of a frame memory 10 is also applied. Subtractor 7 generates a signal representative of a prediction error, or interframe differential image signal.

As will be described later, vector quantizer unit 5 receives the output of subtractor 7 and quantizes an error term formed as the difference between the new sample and a prediction of the new sample based on past coded outputs. Vector quantization is effected on different frequency bands depending on the outputs of comparator unit 4 and supplies index signals to an inverse vector quantizer unit 8 and to a variable length encoder 11. The output of inverse vector quantizer unit 8 is applied to an adder 9 which combines the output of frame memory 10 and applies its output to the frame memory 10. Frame memory 10 introduces a one-frame delay to the input signal and supplies its output to the subtractor 7 as a prediction of the new sample.

Figure 2:
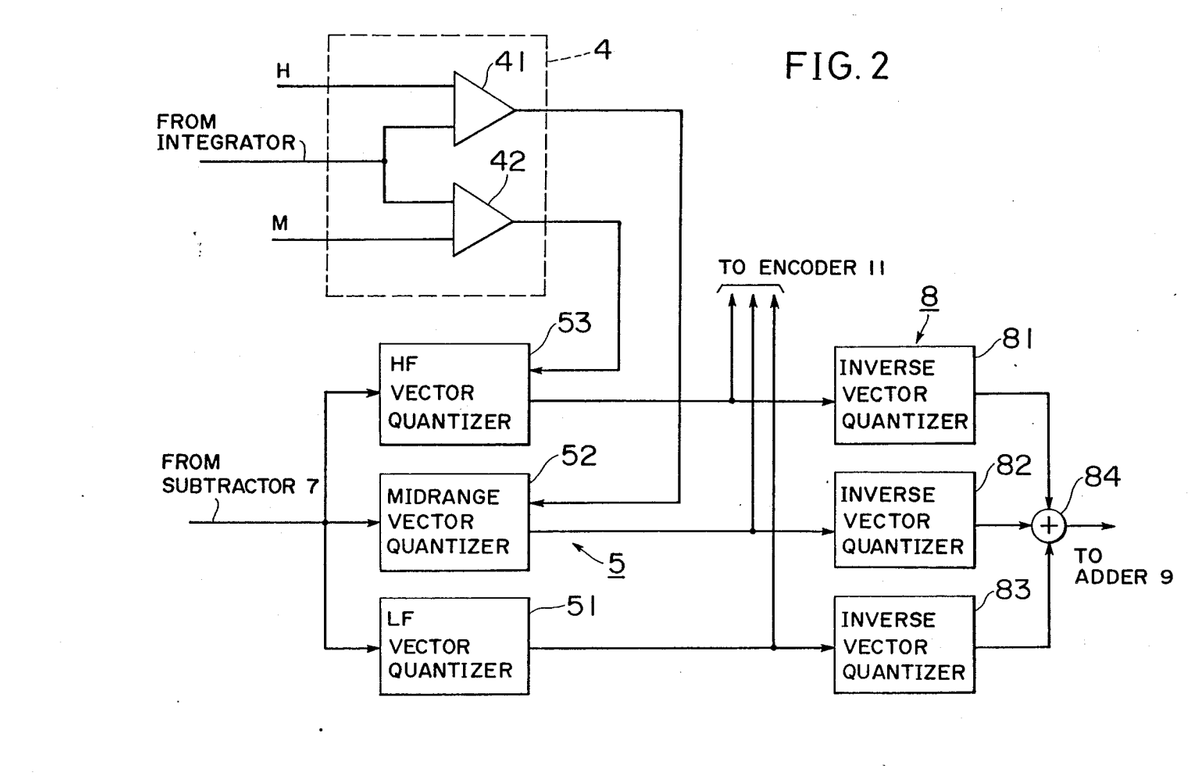
FIG. 2 is a block diagram of a portion of the FIG. 1 embodiment.

As shown in FIG. 2, comparator unit 4 includes high and medium frequency comparators 41 and 42 for making comparison between the output of integrator with high and medium reference values, respectively. Typically, the higher reference value corresponds to moving blocks that occupy more than 20% of the total and the medium reference value those that occupy 10% to 20% of the total. When the total of the moving blocks is below the medium reference value, band-elimination signals are not generated. When it exceeds the medium value, the comparator 42 generates an output that inhibits vector quantization on the highest frequency band and when it further exceeds the higher reference value, the comparator 41 generates an inhibit signal for inhibiting quantization on the medium frequency band in addition to the output of comparator 42.

Vector quantizer unit 5 comprises a low-frequency range vector quantizer 51, a midrange vector quantizer 52 and a high-frequency range vector quantizer 53. The output of high frequency comparator 41 is applied to the inhibit input of midrange vector quantizer 52 and the output of medium frequency comparator 42 is applied to the inhibit input of the high-frequency range vector quantizer 53. It is seen that when the total number of moving blocks exceeds the medium reference value, but not exceeding the high reference value, high-frequency range vector quantizer 53 is disabled, allowing vector quantization to be effected on frequencies below midrange. When the total of moving blocks falls within the high frequency range, comparators 41 and 42 produce their outputs, disabling midrange and high-frequency range vector quantizers 52 and 53 so that vector quantization is effected only upon the low-frequency range.

Figure 3:
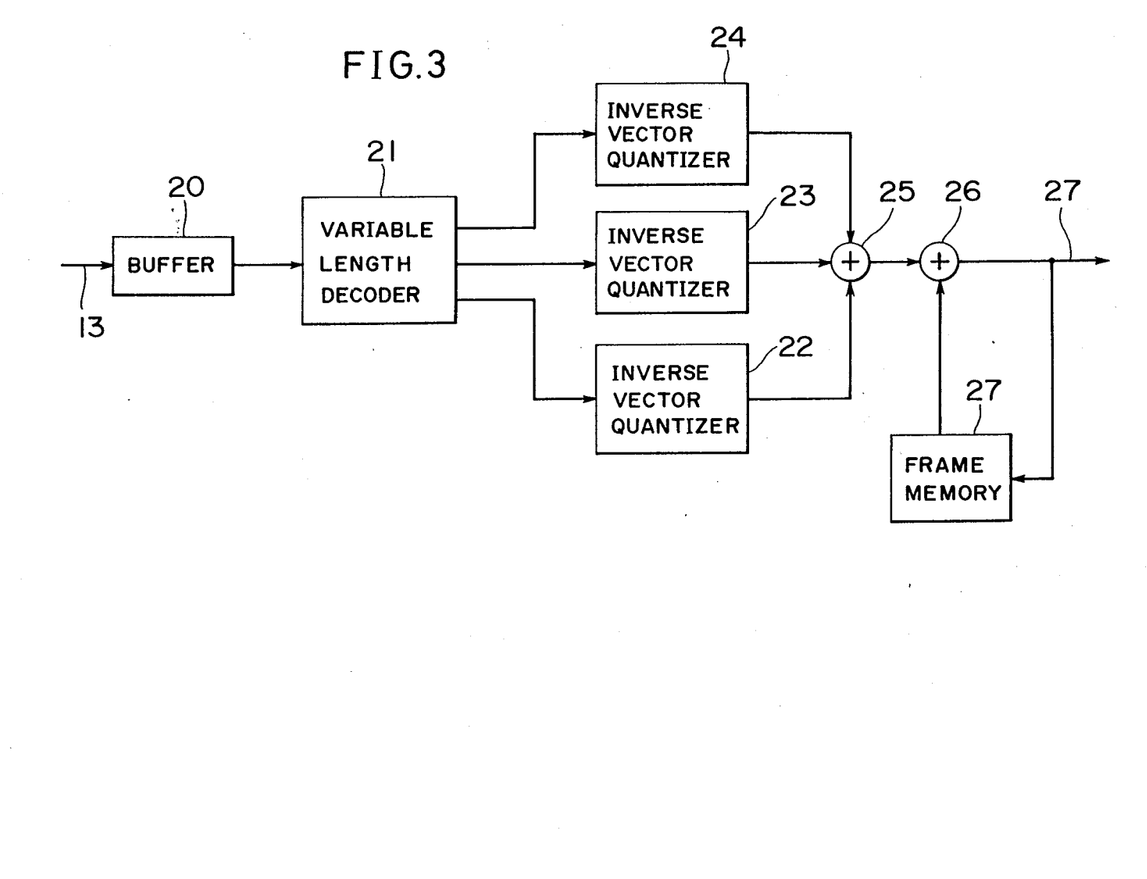
FIG. 3 is a block diagram of a vector quantization decoder associated with the FIG. 1 embodiment.

In FIG. 3, a vector quantization decoder is shown as comprising a buffer 20, a variable length decoder 21, and inverse vector quantizers 22, 23 and 24. Buffer 20 is to absorb the difference between the data transmission speed and the speed at which the variable length code is decoded. The outputs of decoder 21 are coupled respectively to the inverse vector quantizers 22, 23 and 24 to perform inverse vector quantization in a manner inverse to the vector quantizers 51, 52 and 53, respectively. The outputs of inverse vector quantizers 22, 23 and 24 to produce spatial-domain, frequency-divided signals. These signals are summed in an adder 25 to recover the prediction error. An adder 26 is connected to the output of adder 25 to sum the prediction error with the output of a frame memory 27 which introduces a frame interval delay to the prediction error signal to recover the original image sequence at the output line 27.

Returning to FIG. 2, each vector quantizer has a "code table" (or code book) which is an infinite set of output vectors. The code table of each vector quantizer is prepared according to the following steps:

(a) performing orthogonal transform on each of a plurality of interframe differential training image sequences, so that the orthogonally transformed interframe differential training image sequences are mapped onto a frequency domain;

(b) partitioning the mapped training image sequences into different frequency bands;

(c) deriving a plurality of code tables of optimum quantized vectors respectively from the partitioned training image sequences, using the LBG (Linde, Buzo and Gray) algorithm (see Linde, Y., Buzo, A., and Gray, R. M., "An algorithm for vector quantizer design," IEEE Transactions on Communications COM-28 pp. 84–95 (January 1980)); and (d) performing inverse orthogonal transform on the quantized vectors of each of the code tables, so that the inversely orthogonally transformed optimum quantized vectors of each of the code tables are mapped onto a spatial domain.

The output vectors are stored in locations of a read-only memory which are addressable as a function of the prediction error from the subtractor 7. The index of the addressed vector is generated for transmission. According to the data compression technique as taught by the present invention, the index of the addressed vector can be advantageously represented by as much as 10 bits.

Figure 4:
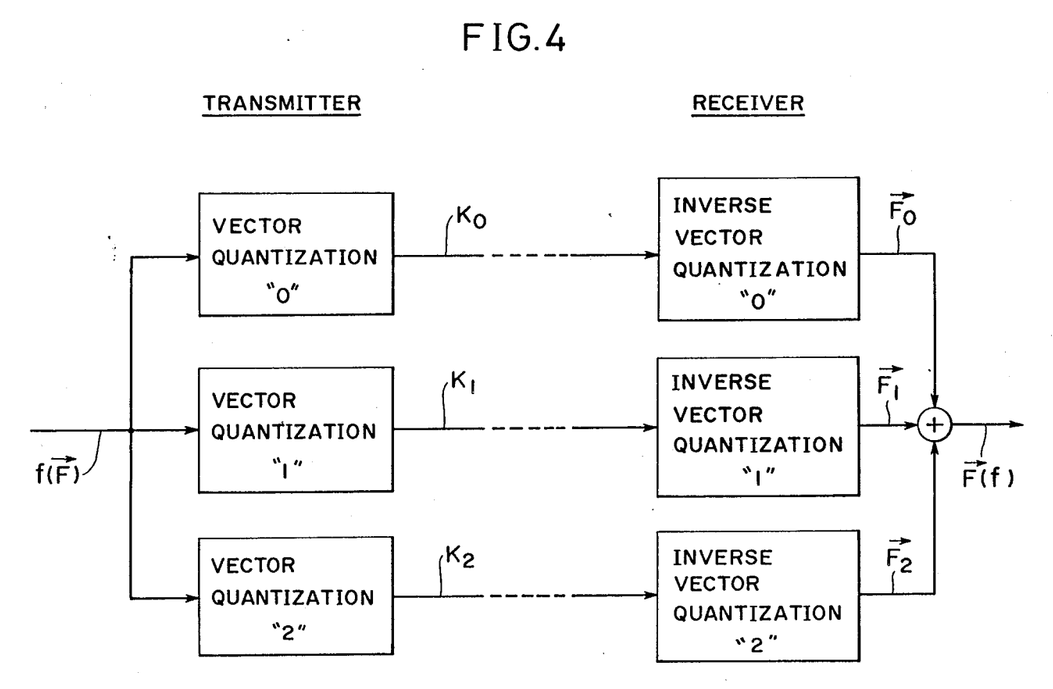
FIG. 4 is a schematic illustration of a communication system useful for understanding the underlying principle of the invention.

Quantitative analysis of the vector quantization of the present invention will be given with reference to FIG. 4. Let $K_0$, $K_1$ and $K_2$ represent the quantized indices of vector quantizers 51, 52 and 53, respectively. The outputs of inverse vector quantizers 22, 23 and 24 of the receiver are represented by spatial domain vectors $\vec{F_0}$, $\vec{F_1}$ and $\vec{F_2}$ corresponding to the indices $K_0$, $K_1$ and $K_2$, respectively, and $\vec{F_0}+\vec{F_1}+\vec{F_2}=\vec{F}$, where F is the vector composed by the pixels of the original block. The following relations hold:

$$\vec{F_0} = [Q^{-1}(K_0)] \quad (1)$$
$$\vec{F_1} = [Q^{-1}(K_1)]$$
$$\vec{F_2} = [Q^{-1}(K_2)]$$
$$\vec{J} = T \cdot \vec{F} \cdot T^t \quad (2)$$

where $Q^{-1}$ is the operator of inverse vector quantization, $\vec{J}$ is the vector in the frequency domain (or conversion space of each code table), T, the operator of orthogonal transform, and $T^t$ is the operator of the transposition of orthogonal transform. Since vector $\vec{J}$ is decomposed into component vectors $\vec{J_0}$, $\vec{J_1}$ and $\vec{J_2}$ in respective frequency bands, the following relations hold:

$$\left. \begin{array}{l} \vec{J_0} = T \cdot \vec{F_0} \cdot T^t \\ \vec{J_1} = T \cdot \vec{F_1} \cdot T^t \\ \vec{J_2} = T \cdot \vec{F_2} \cdot T^t \end{array} \right\} \quad (3)$$

An optimum index which minimizes the electrical power of prediction error P in a frequency band "0", for example, can be obtained as follows:

$$\begin{array}{rl} P &= [Q^{-1}(K_0') - \vec{F}]^2 \quad (4) \\ &= |Q^{-1}(K_0') - \vec{F_0} - \vec{F_1} - \vec{F_2}|^2 \\ &= [Q^{-1}(K_0') - \vec{F_0}]^2 - \\ & \quad 2[Q^{-1}(K_0') - \vec{F_0}][\vec{F_1} + \vec{F_2}] + [\vec{F_1} + \vec{F_2}]^2 \end{array}$$

where $K_0'$ is a representative vector of the low frequency band. Since there is no correlation between different components of the orthogonal transform, there is no correlation between different frequency bands. Since $Q^{-1}(K_0') = \vec{F_0}'$, and $T^t = T^{-1}$ according to Hermit matrix, the following relation holds:

$$\begin{array}{rl} [\vec{F_0}][\vec{F_1}] &= [T^{-1} \cdot \vec{J_0} \cdot T][T^{-1} \cdot \vec{J_1} \cdot T] \\ &= T^{-1} \cdot \vec{J_0} \cdot \vec{J_1} \cdot T \\ &= 0 \end{array}$$

Therefore, $$[Q^{-1}(K_0')][\vec{F_1} + \vec{F_2}] = 0$$
$$[\vec{F_0}][\vec{F_1} + \vec{F_2}] = 0$$

Equation 4 can be written as:

$$P = [Q^{-1}(K_0') - \vec{F_0}]^2 + [\vec{F_1} + \vec{F_2}]^2$$

It is therefore not necessary to partition the input image sequence into different frequency bands prior to vector quantization, thus eliminating the need to provide a hardware for implementing such partitioning.

Using the code tables mentioned above, vector quantizers 51, 52 and 53 can readily perform orthogonal transformation and vector quantization on respective frequencies without the hardware for implementing orthogonal transformation and frequency partitioning. This is done by reading vectors from each memory, or code book as a function of the input prediction error and selects one which is nearest to the input value and which minimizes prediction error. The index of the selected vector is generated by each of the vector quantizers 51, 52 and 53 so that its quantum size is variable non-linearly as a function of the prediction error. The index signals from the quantizer 5 are converted to a variable length codeword by the encoder 11 according to the Huffman coding algorithm. A buffer memory 12 is connected to the variable length encoder 11 to absorb differences in transmission speed between the encoder 11 and a transmission channel 13.

The individual outputs of the vector quantizers 51, 52 and 53 are applied respectively to inverse vector quantizers 81, 82 and 83 of inverse vector quantizer unit 8. Inverse vector quantizers perform inverse vector quantization on the respective index signals and generate output signals which are frequency-divided in the spatial domain. The outputs of the inverse vector quantizers 81, 82 and 83 are summed by an adder 84 and fed to adder 9.

Figure 5:
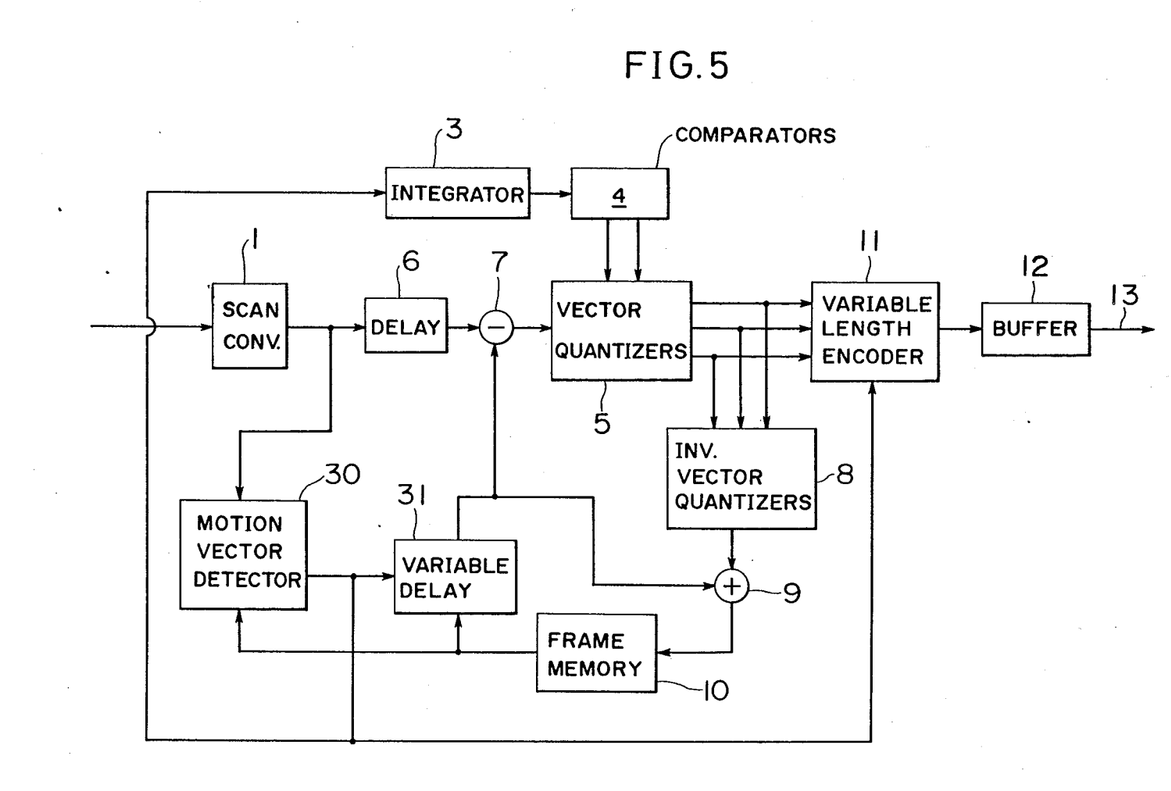
FIG. 5 is a block diagram of a vector quantization encoder of a modified embodiment.

A modified embodiment of the invention is shown in FIG. 5 which differs from the embodiment of FIG. 1 in that it includes a motion vector detector 30 which replaces the motion detector 2 of FIG. 1. Motion vector detector 30 receives inputs from the output of scan converter 1 and from the output of frame memory 10 and detects motion vectors using a technique known as "block matching". The output of motion vector detector 30 is applied to the integrator 3 and to a variable delay 31 to introduce a further delay to the output of frame memory 10 to compensate for vector motion. The output of variable delay 31 is applied to the subtractor 7 and to adder 9 as a prediction error. The output of moving vector detector 30 is further applied to the variable length encoder 11 to effect the motion compensation.

Figure 6:
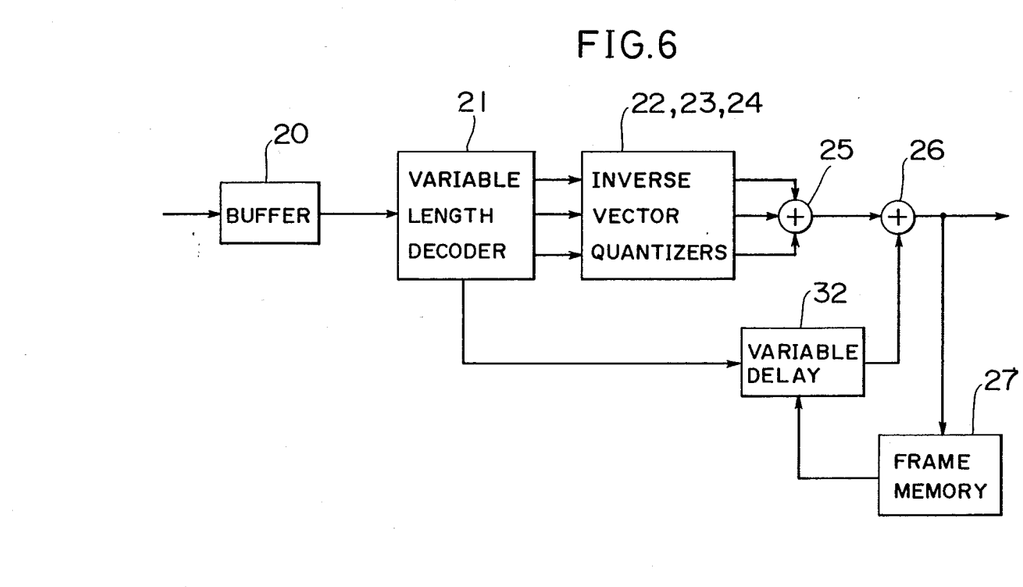
FIG. 6 is a block diagram of a vector quantization decoder associated with the FIG. 5 embodiment.

A vector quantization decoder shown in FIG. 6 is adapted to receive signals from the modified encoder of FIG. 5. This vector quantization decoder differs from the decoder of FIG. 3 in that it includes a variable delay 32 which is responsive to a timing signal from the variable length decoder 21. This output signal is representative of a vector motion detected by the motion vector detector 30. Variable delay 32 introduces a further delay to the output of frame memory 27 to compensate for the vector motion.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A vector quantization encoder comprising:
   a scan converter for converting an input image sequence into a block-formatted sequence;

means for generating a data compression signal indicative of the amount of moving blocks in said block-formatted sequence;

a plurality of vector quantizers individually selectively operable in accordance with said data compression signal, each of said vector quantizers having a particular frequency band and a memory containing output vectors, said output vectors of each of said vector quantizers being representative of inverse orthogonal transform of a code table of optimum quantized vectors in said particular frequency band, said optimum quantized vectors being orthogonal transform of interframe differential training image sequences, said output vectors being readable from said memory as a function of an interframe differential image sequence applied thereto, each of said vector quantizers further including means for selecting one of the output vectors read out of said memory which is nearest to the value of said interframe differential image sequence and generating an index signal representative of the selected vector;

means connected to the outputs of said vector quantizers for generating a predictive image sequence;

subtractor means for detecting a difference between said block-formatted sequence and said predictive image sequence and applying the detected difference to said vector quantizers as said interframe differential image sequence; and means connected to said vector quantizers for encoding said index signals.

2. A vector quantization encoder as claimed in claim 1, wherein said output vectors of each of said vector quantizers are prepared in accordance with the steps of:
(a) performing orthogonal transform on interframe differential training image sequences, so that said orthogonally transformed interframe differential training image sequences are mapped onto a frequency domain;
(b) partitioning the mapped training image sequences into a plurality of frequency bands;
(c) deriving a code table of optimum quantized vectors from the mapped orthogonally transformed interframe differential training image sequences which are partitioned into the frequency band corresponding to said particular frequency band; and
(d) performing inverse orthogonal transform on said optimum quantized vectors, so that the inversely orthogonally transformed optimum quantized vectors are mapped onto a spatial domain as said output vectors, said spatial domain defining storage locations of said memory which are addressable as a function of said interframe differential image sequence.

3. A vector quantization encoder comprising:
a scan converter for converting an input image sequence into a block-formatted sequence;
a motion detector for detecting moving blocks in said block-formatted sequence;
an integrator for integrating said detected moving blocks;
comparator means for comparing the output of said integrator with one or more reference values and deriving therefrom a data compression signal indicative of the amount of said detected moving blocks;
a plurality of vector quantizers individually selectively operable in accordance with said data compression signal, each of said vector quantizers having a particular frequency band and a memory containing output vectors, said output vectors of each of said vector quantizers being representative of inverse orthogonal transform of a code table of optimum quantized vectors in said particular frequency band, said optimum quantized vectors being orthogonal transform of interframe differential training image sequences, said output vectors being readable from said memory as a function of an interframe differerential image sequence, each of said vector quantizers further including means for selecting one of the output vectors read out of said memory which is nearest to the value of said interframe differential image sequence and generating an index signal representative of the selected vector;

a plurality of inverse vector quantizers for performing inverse vector quantization on the index signals from said vector quantizers;

adder means for summing said index signals;

a frame memory for introducing a frame interval delay to an output signal from said adder means and supplying the delayed signal to said adder means to produce a prediction image sequence;

subtractor means for detecting a difference between the outputs of said scan converter and said frame memory for supplying the detected difference to said vector quantizers as said interframe differential image sequence; and encoder means connected to said vector quantizers for encoding said index signals.

4. A vector quantization encoder as claimed in claim 3, wherein said output vectors of each of said vector quantizers are prepared in accordance with the steps of:
(a) performing orthogonal transform on interframe differential training image sequences, so that said orthogonally transformed interframe differential training image sequences are mapped onto a frequency domain;
(b) partitioning the mapped training image sequences into a plurality of frequency bands;
(c) deriving a code table of optimum quantized vectors from the mapped orthogonally transformed interframe differential training image sequences which are partitioned into the frequency band corresponding to said particular frequency band; and
(d) performing inverse orthogonal transform on said optimum quantized vectors, so that the inversely orthogonally transformed optimum quantized vectors are mapped onto a spatial domain as said output vectors, said spatial domain defining storage locations of said memory which are addressable as a function of said interframe differential image sequence.

5. A vector quantization encoder as claimed in claim 3, wherein said motion detector detects motion vector and controls the timing of said encoder means in accordance with the detected motion vector, and said decoder means generates a timing signal representative of the detected motion vector, further comprising:
variable delay means connected between said subtractor and said frame memory for introducing a variable delay to said prediction image sequence in accordance with the detected motion vector.

6. A communication system comprising:
a scan converter for converting an input image sequence into a block-formatted sequence;

means for generating a data compression signal indicative of the amount of moving blocks in said block-formatted sequence;
a plurality of vector quantizers individually selectively operable in accordance with said data compression signal, each of said vector quantizers having a particular frequency band and a memory containing output vectors, said output vectors of each of said vector quantizers being representative of inverse orthogonal transform of a code table of optimum quantized vectors in said particular frequency band, said optimum quantized vectors being orthogonal transform of interframe differential training image sequences, said output vectors being readable from said memory as a function of an interframe differential image sequence applied thereto, each of said vector quantizers further including means for selecting one of the output vectors read out of said memory which is nearest to the value of said interframe differential image sequence and generating an index signal representative of the selected vector;
means connected to the outputs of said vector quantizers for generating a predictive image sequence;
subtractor means for detecting a difference between said block-formatted sequence and said predictive image sequence and applying the detected difference to said vector quantizers as said interframe differential image sequence;
encoder means connected to said vector quantizers for encoding said index signals and transmitting the encoded signals through a transmission medium;
decoder means connected to said transmission medium for decoding said transmitted signals;
a plurality of inverse vector quantizers for performing inverse vector quantization on said decoded signals; and
means connected to the outputs of said inverse vector quantizers for generating a replica of said block-formatted sequence.

7. A communication system comprising:
a scan converter for converting an input image sequence into a block-formatted sequence;
a motion detector for detecting moving blocks in said block-formatted sequence;
an integrator for integrating said detected moving blocks;
comparator means for comparing the output of said integrator with one or more reference values and deriving therefrom a data compression signal indicative of the amount of said detected moving blocks;
a plurality of vector quantizers individually selectively operable in accordance with said data compression signal, each of said vector quantizers having a particular frequency band and a memory containing output vectors, said output vectors of each of said vector quantizers being representative of inverse orthogonal transform of a code table of optimum quantized vectors in said particular frequency band, said optimum quantized vectors being orthogonal transform of interframe differential training image sequences, said output vectors being readable from said memory as a function of a prediction error applied thereto, each of said vector quantizers further including means for selecting one of the output vectors read out of said memory which is nearest to the value of said interframe differential image sequence and generating an index signal representative of the selected vector;
a plurality of inverse vector quantizers for performing inverse vector quantization on the index signals from said vector quantizers;
first adder means for summing said index signals;
a first frame memory for introducing a frame interval delay to an output signal from said adder means and supplying the delayed signal to said first adder means to produce a predictive image sequence;
subtractor means for detecting a difference between the outputs of said scan converter and said frame memory for supplying the detected difference to said vector quantizers as said interframe differential image sequence;
encoder means connected to said vector quantizers for encoding said index signals and transmitting the encoded signals through a transmission medium;
decoder means connected to said transmission medium for decoding said transmitted signals;
a plurality of inverse vector quantizers for performing inverse vector quantization on said decoded signals;
second adder means for summing the outputs of said inverse vector quantizers; and
a second frame memory for introducing a frame interval delay to an output signal from said second adder means and applying the delayed output signal to said second adder means to generate a replica of said block-formatted sequence.

8. A communication system as claimed in claim 7, wherein said motion detector detects motion vector and controls the timing of said encoder means in accordance with the detected motion vector, and said decoder means generates a timing signal representative of the detected motion vector, further comprising:
first variable delay means connected between said subtractor and said frame memory for introducing a variable delay to said predictive image sequence in accordance with said detected motion vector; and
second variable delay means connected between said second adder means and said second frame memory for introducing a variable delay to the output of said second frame memory in accordance with said timing signal from said decoder means.

9. A method for producing code tables, comprising the steps of:
(a) performing orthogonal transform on interframe differential training image sequences, so that said orthogonally transformed interframe training image sequences are mapped onto a frequency domain;
(b) partitioning the mapped training image sequences into different frequency bands;
(c) deriving a plurality of code tables of optimum quantized vectors respectively from the partitioned training image sequences; and
(d) performing inverse orthogonal transform on said quantized vectors of each of said code tables, so that the inversely orthogonally transformed optimum quantized vectors of each of said code tables are mapped onto a spatial domain.

* * * * *